Feb. 28, 1967  K. ZUSE  3,306,128
COMPOUND GEAR TRAIN UNIT WITH SLIP-FREE
AND THRUST-FREE COUPLING MEANS
Filed March 8, 1963  14 Sheets-Sheet 1

INVENTOR
KONRAD ZUSE

By:
*Silverman, Mullin & Case*
Att'ys

Feb. 28, 1967  K. ZUSE  3,306,128
COMPOUND GEAR TRAIN UNIT WITH SLIP-FREE
AND THRUST-FREE COUPLING MEANS
Filed March 8, 1963  14 Sheets-Sheet 2

Feb. 28, 1967  K. ZUSE  3,306,128
COMPOUND GEAR TRAIN UNIT WITH SLIP-FREE
AND THRUST-FREE COUPLING MEANS
Filed March 8, 1963  14 Sheets-Sheet 4

INVENTOR
KONRAD ZUSE

By:
*Silverman, Mullin & Cass*
Att'ys.

Feb. 28, 1967

K. ZUSE 3,306,128

COMPOUND GEAR TRAIN UNIT WITH SLIP-FREE
AND THRUST-FREE COUPLING MEANS

Filed March 8, 1963

INVENTOR
KONRAD ZUSE

INVENTOR
KONRAD ZUSE

INVENTOR
KONRAD ZUSE

INVENTOR
KONRAD ZUSE

INVENTOR
KONRAD ZUSE

Feb. 28, 1967 K. ZUSE 3,306,128
COMPOUND GEAR TRAIN UNIT WITH SLIP-FREE
AND THRUST-FREE COUPLING MEANS
Filed March 8, 1963 14 Sheets-Sheet 10
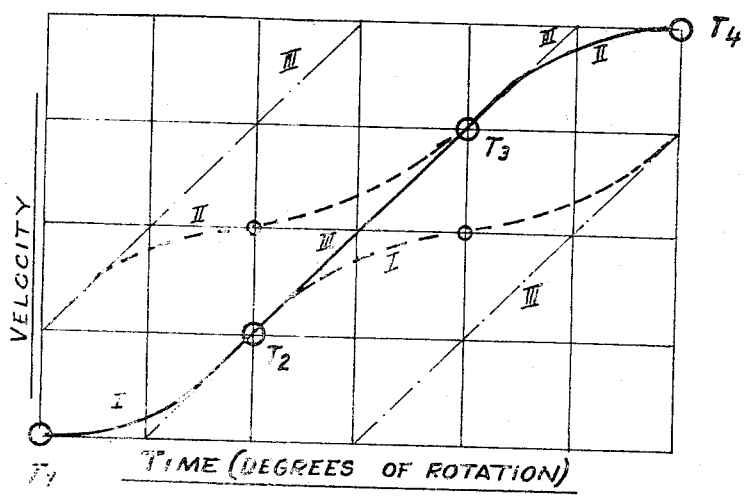
Fig. 13
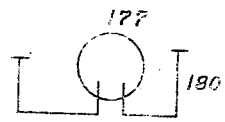
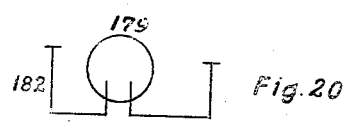
Fig. 20
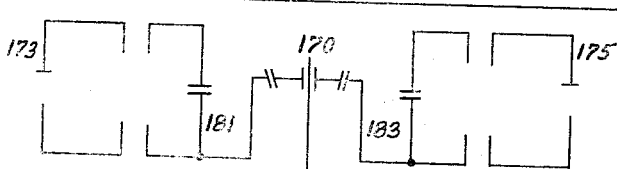
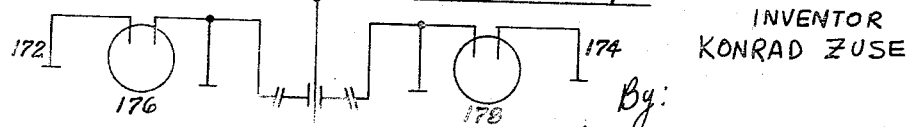
INVENTOR
KONRAD ZUSE Feb. 28, 1967 K. ZUSE 3,306,128
COMPOUND GEAR TRAIN UNIT WITH SLIP-FREE
AND THRUST-FREE COUPLING MEANS
Filed March 8, 1963 14 Sheets-Sheet 11

INVENTOR
KONRAD ZUSE

By:
Silverman, Mullin & Cass
Att'ys.

Feb. 28, 1967  K. ZUSE  3,306,128
COMPOUND GEAR TRAIN UNIT WITH SLIP-FREE
AND THRUST-FREE COUPLING MEANS
Filed March 8, 1963  14 Sheets-Sheet 12
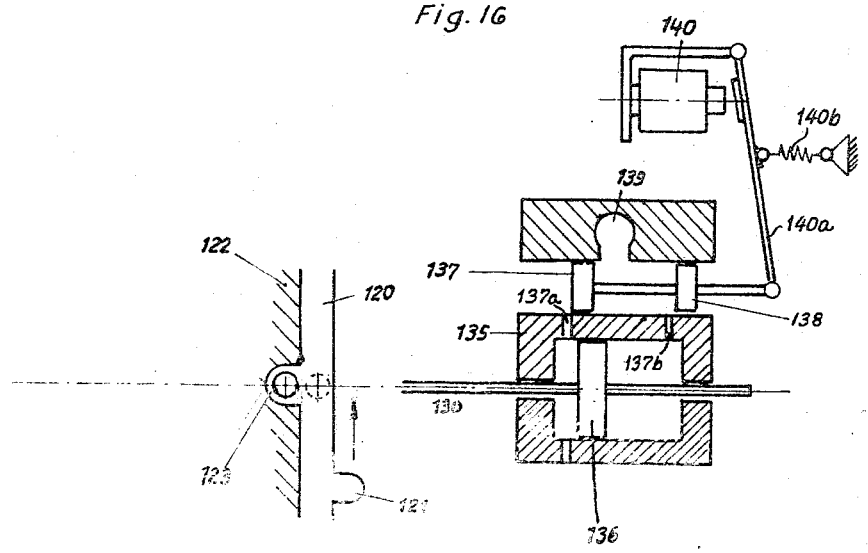
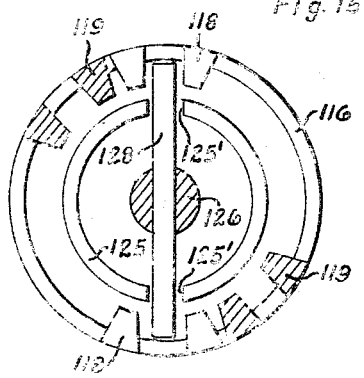
INVENTOR
KONRAD ZUSE

United States Patent Office 3,306,128
Patented Feb. 28, 1967

3,306,128
COMPOUND GEAR TRAIN UNIT WITH SLIP-FREE AND THRUST-FREE COUPLING MEANS
Konrad Zuse, Im Haselgrund 21, Hunfeld, Rhon, Germany
Filed Mar. 8, 1963, Ser. No. 263,864
Claims priority, application Germany, Mar. 13, 1962, Z 9,291
7 Claims. (Cl. 74—679)

This invention relates generally to a clutch or coupling mechanism for the selective coupling and uncoupling of two or more driving shafts and a driven shaft. More particularly, this invention is directed to a clutch mechanism which accomplishes such coupling and uncoupling operations with a uniform rate of angular velocity and without introducing either an undesirable tangential thrust component into the coupling gears or an equally undesirable slipping component between the driven and driving shafts.

The term "thrust" refers to a tangential force component created by a sudden change, either acceleration or deceleration, in the angular velocity of the driven member. This thrust component causes undue wear and stress on the engaging members of the gear trains and can cause slipping or failure of the engaging teeth.

The necessity for providing a slip-free and thrust-free clutch has widespread significance in the control of tools, automatic drawing tables, engraving devices and the like. Some of the conventional coupling devices, such as friction couplings, provide a thrust-free coupling operation, but introduce an equally undesirable slip component. Other conventional coupling devices, such as jaw clutches or spur gears, operate without slip, but these devices are subject to tangential thrusts due to sudden changes in angular velocities in the driven members.

German Patent 971,296 discloses another transmission with a proposed solution for a slip-free and thrust-free coupling between a driven shaft and a plurality of driving shafts. Such transmission has a clutch mechanism that selectively couples the driving shaft to one of two gear trains through a release lever while the transmission is in motion. Whereas this arrangement accomplishes the coupling operation without slip, an undesirable tangential thrust component is present.

Further improvements over the above cited German patent and the other conventional coupling mechanisms or clutches are desscribed in U.S. patent application 169,727, now abandoned, and the co-pending continuation application based upon this abandoned application, Serial No. 511,678. The coupling mechanisms in the cited applications smoothly accelerate a driven shaft until this shaft is rotated at the same angular velocity as the drive shaft.

At this point in the cycle of operation, the two shafts are automatically coupled together through the engagement of two sets of shiftable coupling bolts within the slots of two spaced Geneva wheels mounted on intermediate shafts. The rotational movements imparted to these intermediate shafts are equal in magnitude but phase-offset with relation to one another, and an integrator mechanism is provided between the intermediate shafts and the driven shaft to superimpose the movements of the two intermediate shafts into a uniform resultant movement at the driven shaft. The successful operation fo such coupling mechanisms required the incorporation therein of spring biased locking levers to maintain and align the driven shaft stationary just prior to the engagement of the coupling bolts and the Geneva wheels.

While such coupling mechanisms functioned satisfactorily under most operational conditions, the necessity of accurately aligning the driven shaft, in a motionless position, limited the maximum angular velocities at which the mechanisms could perform satisfactorily. This factor, in turn, limited the resultant angular velocity of the driven shaft and decreased the potential size of power take-off trains that could be operated by the driven shaft. Also, the springs biasing the locking levers were subject to fatigue and accurate alignment after protracted operation presented some difficulties.

Accordingly, an object of the present invention is to overcome the above noted failings of prior art coupling mechanisms by providing a positive action coupling mechanism.

It is another object to provide a simplified coupling mechanism that functions in a slip-free and thrust-free manner although the driven shaft is not held motionless by elaborate restraining devices.

Another object is to produce a coupling mechanism that operates quickly and effectively over a great range of angular velocities.

A further object is to construct a compound gear train of simplified design wherein a single centrally located drive input unit is operable to control the alternate engaging, and disengaging, of a plurality of coupling mechanisms disposed radially about such input unit.

Still another object is to provide a coupling mechanism including a central input drive unit with a rotatable disc having a pair of rocking levers operably connected thereto so that the drive input unit produces two equal phase-shifted oscillations at its output gears. The motion of these output gears is subsequently combined through the operation of a coupling mechanism and integrator mechanism into a uniform resultant velocity at the driven shaft.

In accordance with the principles of applicant's invention, a coupling mechanism would employ an input drive unit having a constantly rotating input shaft with a driving gear connected thereto, the driving gear engaging and rotating both crank shaft sub-assembly and a coupling disc sub-assembly, such coupling disc sub-assembly having a pair of angularly spaced oscillating levers mounted thereon and operated by the crank shaft sub-assembly to impart phase offset, rotational movement to a pair of output gear wheels mounted on intermediate shafts. The output gears are connected to a similar pair of input gears for the coupling unit, which unit also includes an output shaft, integrator mechanism to drivingly actuate the output shaft in response to the forces applied to the input gears and a selectively operable clutching subassembly to enable, or disable, the forces applied to the input gears from being transmitted to the integrator mechanism. Such clutching subassembly, which is axially movable along the driven output shaft, is controlled by coupling bolts that engage camming surfaces on the perimeter of the rotating coupling disc and selectively pivot a linkage system joined to the clutching subassembly in accordance with the configuration of the camming surfaces.

Additional objects and advantages of the present invention will become apparent from the following disclosure when construed in conjunction with the accompanying drawings, wherein:

FIG. 13 is a graph showing the periodic oscillating movements fed into a modified coupling unit;

FIG. 15 is a vertical cross-sectional view of the clutching mechanism, this view being taken along line 15—15 in FIG. 14, and in the direction indicated;

FIG. 16 is a pneumatic control device for the clutching mechanism of FIG. 14;

FIG. 20 is a schematic representation of another power take-off gear train.

Figure 1:
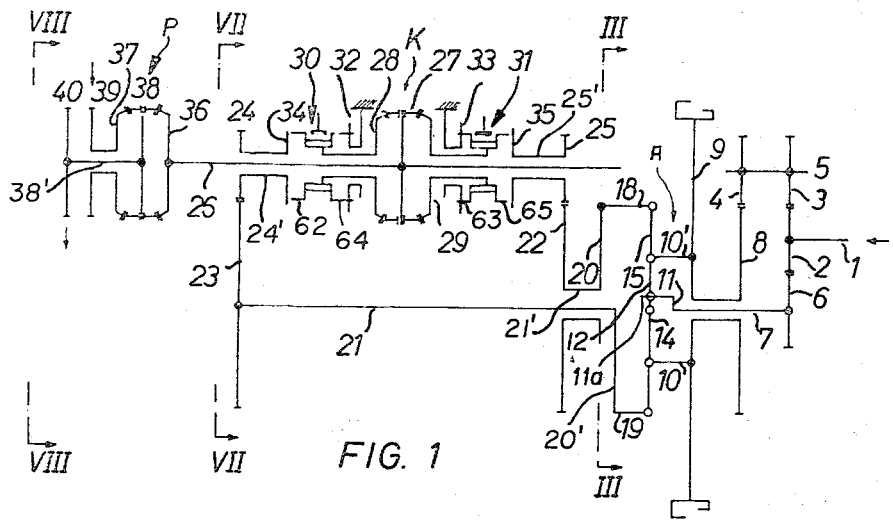
FIG. 1 is a mechanical schematic representation of an input drive mechanism, a coupling unit, and a power take-off unit.

Referring now to the drawings, FIG. 1 shows an input driving gear unit A; one of a plurality of coupling units K, and a first step of a power take-off gear train unit P. The description of these assemblies proceeds from right to left with reference to FIG. 1 and traces the power path through the entire assembly.

Input shaft 1, which is rotated at a constant angular velocity by a conventional motor (not shown), provides the motive force for the entire assembly. An input gear 2, which may be a spur gear, is secured to shaft 1 and rotates in unison therewith.

Pinion gear 3, which is secured to parallel shaft 5, is positioned in engagement with input gear 2. Another pinion gear 4 is secured to the opposite end of shaft 5 and rotates in the same direction and at the same speed as gear 3. Larger gear 8 is freely rotatable about its horizontally extending support shaft, crank shaft 7. Gear 4 engages gear 8 and rotates the same. A coupling disc 9 is integrally formed with gear 8 and rotates in unison therewith about crank shaft 7, which shaft defines its central horizontal axis.

Another pinion gear 6 is secured to one end of shaft 7 at a position below input gear 2. The engagement of gear 6 with input gear 2 rotates crank shaft 7 at a constant velocity. A crank 11 is fixed to the end of shaft 7 farthest from pinion gear 6 and such crank rotates in the direction opposite to that of coupling disc 9.

In a preferred embodiment, disc 9 rotates in the opposite direction at an angular velocity one-sixth as great as the velocity of crank 11, and such members are coaxially mounted.

It should be noted that such relative angular velocities are maintained regardless of the angular velocity of shaft 1, for the movement of both disc 9 and crank 11 derive motive power from this source.

Figure 3:
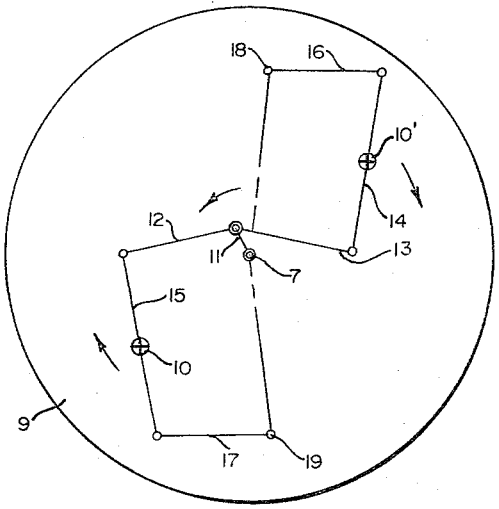
FIG. 3 is a vertical cross-sectional view of a coupling disc and rocking levers taken along line 3—3 in FIG. 1, and in the direction indicated.
Figure 3A:
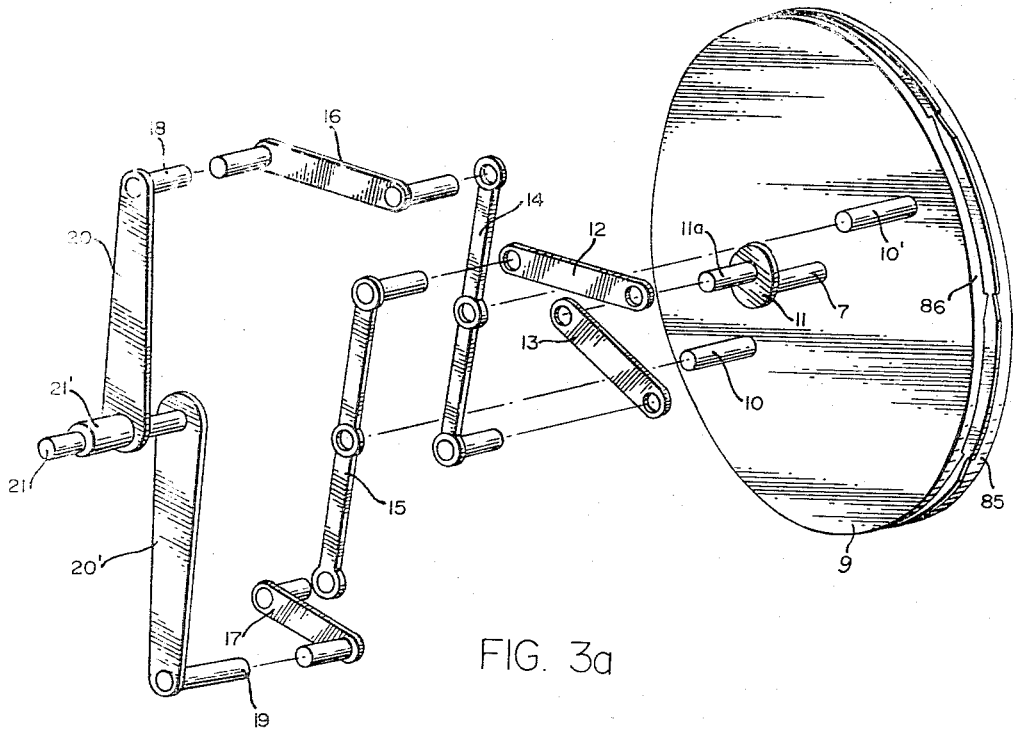
FIG. 3a is an exploded perspective view of the coupling disc and rocking levers in FIG. 3.

The coupling disc associated with shaft 7, is shown schematically in FIG. 3 and perspectively in FIG. 3a. A pair of diametrically opposite posts 10, 10' extend laterally away from one face of disc 9 for purposes to be described subsequently. Each of rods 12 and 13 have one end secured to stub shaft 11a, which shaft extends axially from a face of crank 11. Rods 12 and 13 are joined at their opposite ends to the ends of rocking levers 15 and 14, respectively.

Levers 14 and 15 are pivotably mounted at their midpoint upon posts 10 and 10' on disc 9. The other ends of levers 14 and 15 are joined to links 16 and 17 by pins 18 and 19, respectively. Pins 18 and 19 are connected at their opposite ends to crank levers 20 and 21', respectively. Crank lever 20' is secured to a second intermediate shaft 21'. These intermediate driven shafts are coaxially aligned although shaft 21 extends axially beyond the end of shaft 21'. A first output gear 22 is mounted at the end of shaft 21', and a second output gear 23 is mounted at the ends of shaft 21 as seen in FIG. 1.

Input drive unit A functions in the following manner. Crank shaft 7 is driven by input shaft 1 and the related gearing thereby rotates crank 11 and stub shaft 11a. Shaft 11a imparts an oscillating movement to rocking levers 14 and 15, which oscillate about their midpoints on posts 10 and 10'. The oscillatory movement of levers 14 and 15 is transmitted by links 16 and 17 to levers 20 and 20', which members, in turn, impart such motion to output gears 22 and 23, respectively, via intermediate shafts 21 and 21'.

The specific arrangement of the above described components is such that lever 20 imparts its rotational force, which is sinusoidal in nature, to gear 22 at a point in the operational cycle 90° ahead of the point at which lever 20' will impart its identical rotational force to gear 23. The resultant movement produced by gears 22 and 23, after being superimposed by integrating mechanism in the coupling unit K, is an almost perfectly uniform movement of output shaft 26 for when gear 22 is rotating at its maximum angular velocity, gear 23 is almost motionless, and vice versa.

Figure 2:
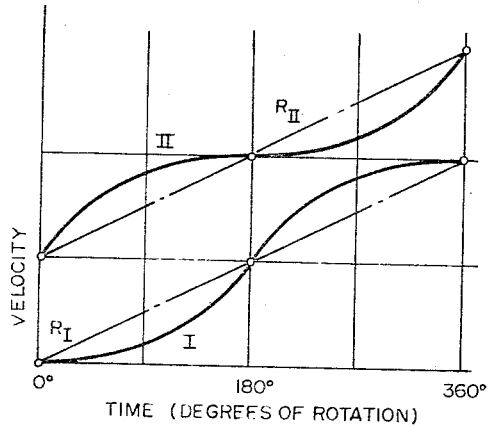
FIG. 2 is a graph of angular velocity vs. time showing the periodic oscillating movements fed into each coupling unit.

FIG. 2 illustrates this relationship with greater clarity in a graphical manner. The horizontal coordinate represents time, or degrees of rotation, and the vertical coordinate represents angular velocity. Roman numeral I identifies the velocity trace for output gear 22, and Roman numeral II identifies the velocity trace for output gear 23. The dotted line in both instances identifies the constant velocity rotation of disc 9 upon which the oscillatory movements of levers 14 and 15 are superimposed. The sinusoidal motion traces of gears 22 and 23 are phase-offset, so that when gear 23 is rotating at maximum velocity, gear 22 is motionless and vice versa, thereby permitting an algebraic summation that results in an almost constant force.

The symbol T indicates the most opportune time for engaging a coupling unit K to output gears 22 and 23. At such point in the operational cycle, one of the two gears will be motionless and a corresponding gear at one side of the coupling unit indicated by reference character K, can be accurately engaged with the motionless output gear. When the other output gear is motionless, later in the cycle, then, once again, a corresponding gear at the opposite side of coupling unit K can accurately be engaged with the other gear. In this manner, unit K can be efficiently engaged with gears 22 and 23 without introducing either slip or thrust into the unit K. The disengagement of unit K from gears 22 and 23 takes place in a similar manner.

Coupling unit K, as shown in FIG. 1, functions as an integrator to algebraically sum the two phase-shifted movements introduced by output gears 22 and 23 and to transmit the resultant movement to drive shaft 26. The integrator mechanism 27 employs bevel gears rotatably mounted on a spider, which spider is rigidly connected with shaft 26. The illustrated embodiment to alternatively drive a central bevel gear, could also use other conventional types of mechanical integrators, with equal success.

The centrally located driven gear of integrator 27 is secured to shaft 26 by a pin on shaft that passes through shaft 26. Under normal, or disengaged position, unit K is not coupled to input drive unit A and gear 27 and shaft 26 are at rest. Input gears 24 and 25 of unit K are engaged with output gears 23 and 22 of unit A, respectively, and receive phase-shifted, rotational input forces therefrom. However, gears 24 and 25 are freely rotatable about shaft 26 and no motion is transmitted to integrator mechanism 27 for motion transmitting bevel gears 28 and 29 are out of engagement with coupling rings 30 and 31, which are situated adjacent to gears 28 and 29 along shaft 26.

Figure 4:
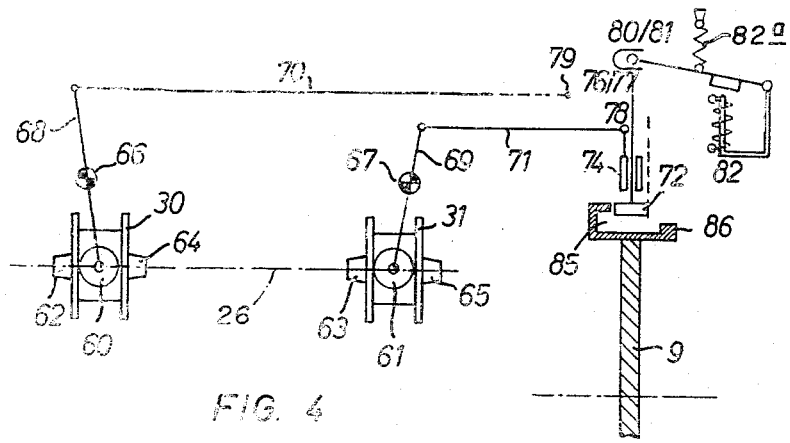
FIG. 4 shows the clutching mechanism and the associated control elements for shifting such clutching mechanism.

The configuration of coupling rings 30 and 31 per se is seen in FIG. 4, and the relationship of such rings to the other elements of coupling unit K is seen in FIG. 1. FIG. 1 shows the disengaged, or normal, position of the coupling rings, wherein the right hand, axially extending jaw 64 of ring 30 is engaged with notched disc or detent ring 32, and the lefthand, axially extending jaw 63 of ring 31 is engaged with notched disc or detent ring 33. In this position, gears 24 and 25 rotate freely about shaft 26 without imparting any rotational forces thereto through integrator mechanism 27.

Ring 30 has a left hand, axially extending jaw 62, which jaw is engaged with a seating member of complementary shape (not shown) on clutch disc 34 when ring 30 is shifted axially to the left along shaft 26 out of its normal position. In this position, which is the operative position, the rotative forces applied to gear 24 are transmitted by collar 24′ to clutch disc 34 and thence to gear 28 of integrator mechanism 27.

Ring 31 has a right hand, axially extending jaw 65, which jaw is engaged with a seating member of complementary shape (not shown) on clutch disc 35 when ring 31 is shifted axially to the right along shaft 26 out of its normal position. In this position, which is the operative position, the rotative forces applied to gear 25 are transmitted by collar 25′ to clutch disc 35 and thence to gear 29 of integrator mechanism 27.

The mechanism for controlling the selective axial adjustment of rings 30 and 31, is shown in FIGS. 4, 5, 6 and 6a. A pin 60 is secured to ring 30, and lever 68, has one end secured to pin 60. Lever 68 is fastened at its midpoint upon shaft 66, which serves as a pivot point for the movement of the lever in response to the forces exerted by the movement of lever 70, which is joined at its horizontal extremity to one end of lever 68. The opposite end of lever 70 is shown in dotted lines and is identified by reference numeral 79; end 79 is shifted by armature 80 in response to the energization of solenoid 82. End 79 actuates vertical arm 76 to raise or lower coupling bolt 72.

Coupling ring 31 is shifted axially by an identical structural arrangement. Pin 61 is secured to ring 31, and lever 69, in turn, has one end secured to pin 61. Lever 69 is fastened at its midpoint to rigid shaft 67, which shaft serves as a pivot point for the movement of this lever in response to forces exerted by the movement of lever 71. Lever 71 has an extremity 78 that is responsive through armature 81 to the energization of solenoid 82. End 78 is joined to vertically extending arm 77 to raise or lower coupling bolt 73.

Arms 76 and 77 are guided in their raising and lowering movements by sleeves 74 and 75. The actuating signals for solenoid 82, which controls the engagement of bolts 72 and 73, are generated from any suitable remote source, such as computer, punched card or tape, or by manual control. Obviously, a number of solenoids can be spaced above the periphery of disc 9; one solenoid for each unit K.

The normal disengaged relationship of input drive unit A to coupling unit K is defined in the following manner. In such condition, solenoid 82 is unactuated and spring 82a biases armature 81, which is hidden behind armature 80 in FIG. 4, out of engagement with vertically shiftable coupling bolts 72 and 73. Such bolts are in the plane of rotation for link 86 on disc 9, as seen in FIG. 4, but are vertically spaced from link 86. Link 85, which is also formed on the periphery of disc 9, is located in a different plane of rotation, so that bolts 72 and 73 do not normally cooperate with the camming surfaces 85 and 86 of coupling disc 9. Therefore, shiftable coupling rings 30 and 31 remain engaged with stationary discs on detenting rings 32 and 33 so that gears 28 and 29 of integrating mechanism 27 do not receive any driving forces. Exterior gears 24 and 25 are engaged with output gears 23 and 22 of unit A, and rotate freely about shaft 26.

Figure 5:
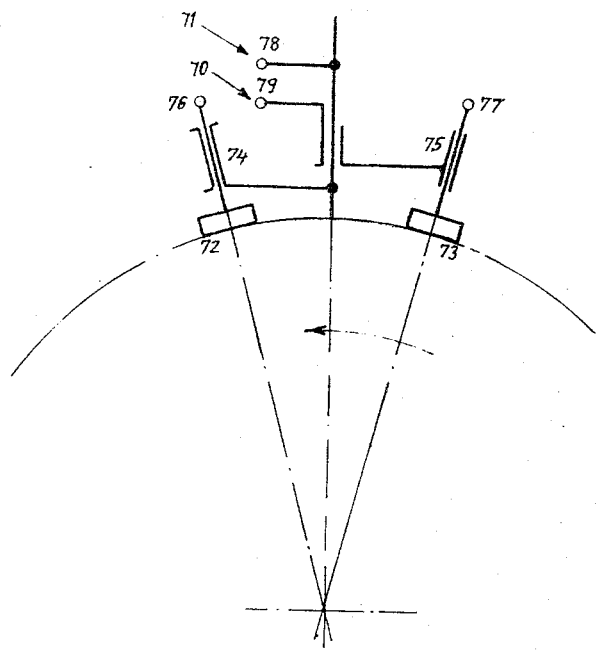
FIG. 5 shows the spatial relationship between the coupling bolts and the rotating disc of the input drive unit.

The process for coupling unit K to unit A occurs in the following sequence. Solenoid 82 is energized by a control signal from a remote source, and armatures 80 and 81 are moved downwardly in response to this magnetic attraction. Armatures 80 and 81 thereby shift coupling bolts 72 and 73 into the path of link 85 on the periphery of disc 9. Bolts 72 and 73 are angularly offset from one another in the path of link 85 as seen in FIG. 5, so that first bolt 72 and then bolt 73 will be contacted by camming surface 85 on rotating disc 9.

Figure 6A:
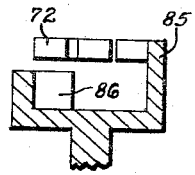
FIG. 6a is an elevational view of FIG. 6.
Figure 7:
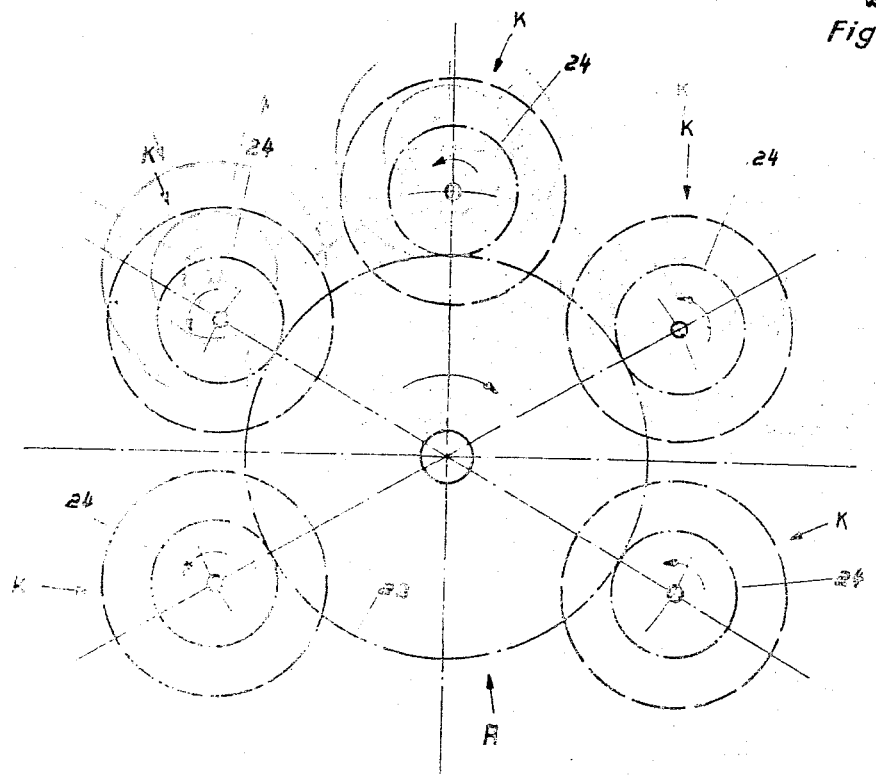
FIG. 7 is a vertical cross-sectional view of the relationship between an output gear of the input drive unit and a plurality of coupling units, this view being taken along line 7—7 in FIG. 1, and in the direction indicated.
Figure 6:
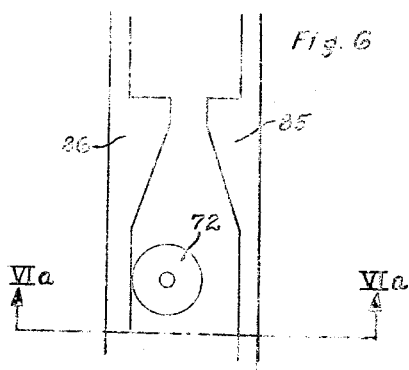
FIG. 6 is a detailed plan view of a coupling bolt and an engaging surface on the periphery of the disc.

When bolt 72 is cammed laterally by the sloping surface of approaching link 85, as seen in FIG. 6a, then lever 71 is also moved laterally and causes lever 69 to pivot clockwise about shaft 67 and thereby shift coupling ring 31 axially to the left. Such movement forces coupling jaw 63 into engagement with bevel gear 29 so that the rotative force applied to exterior gear 25 of unit K from output gear 22 of unit A will be transmitted to integrator mechanism 27 and thence to driven output shaft 26.

As coupling disc 9 continues to rotate, coupling bolt 73 will be cammed laterally by the sloping surface of the next approaching link 85, as seen in FIG. 3a. The lateral movement of bolt 73 moves lever 70 to the right and causes lever 68 to pivot counterclockwise about shaft 66 and thereby shift coupling ring 30 axially to the right. Such movement forces coupling jaws 64 into engagement with bevel gear 28 so that the rotative force applied to exterior gear 24 of unit K from output gear 23 of unit A will be transmitted through gear 28 to integrator mechanism 27 and thence to output shaft 26. After both of the phase-shifted movements related to bolts 72 and 73 have been superimposed by integrator mechanism 27, driven shaft 26 will be driven at a nearly uniform constant speed and units A and K will have been coupled together without slip or thrust components of force. Bolts 72 and 73 will remain in operative position as long as a remote signal is applied to solenoid 82, and the above described process will be repeated for each radially spaced coupling unit K as disc 9 continues to rotate.

The uncoupling or disengagement of coupling rings 30 and 31 from motion transmitting position occurs in the following manner. The remote control signal to solenoid 82 ceases, and spring 82a biases armatures 80 and 81 upwardly. This moves coupling bolts 72 and 73 successively cammed laterally to the right as viewed in FIG. 4. Coupling rings 30 and 31 are therefore axially shifted in phase-offset relationship by levers 70 and 71 into their locking inoperative condition with detent rings 32 and 33. Shaft 26 gradually and smoothly returns to its normal, unactuated condition.

Obviously, camming surfaces 85 and 86 on the perimeter of disc 9 can assume a variety of shapes. For example, surface 85 could be used exclusively for the control of bolt 72, and surface 86 could be used for the control of bolt 73 and the central position between the two camming surfaces could define an inoperative control position wherein spring 82a could return bolts 72, 73 to their normal position. As seen in FIG. 3a, the surfaces 85 and 86 extend as continuous bands about the entire periphery of disc 9. The angular distance from one high point to the next high point on either camming surface is correlated with the radial spacing of coupling units K about central input drive unit A.

Now that the engagement of a representative coupling unit K to input drive unit A has been described in detail, let us examine the manner in which unit A can provide the driving force for gear train power take-off units P in a simple and space saving manner. As seen in FIG. 1, driven shaft 26 is joined to bevel gear 36 of a second integrator mechanism 38. Integrator 38, which is permanently joined to shaft 38', superimposes the movements of bevel gears 36 and 37, and produces a uniform rotational force on shaft 38'. A driven gear 40 is mounted on the opposite end of shaft 38' and rotates in unison therewith. Gear 39, which is mounted loosely upon shaft 38', is driven by an external force indicated by a downwardly extending arrow in FIG. 1. Gear 39 drives bevel gear 37 to provide the motive force for the other half of integrator mechanism 38. The resultant rotational output force of gear 40 will be transferred to the integrator mechanism of a succeeding gear train unit.

Due to the operational efficiency of input drive unit A, and coupling unit K, unit A can transfer power to a plurality of gear train power take-off units P. Units P may either step-up or step-down the angular velocity of gear 40, depending upon the nature of the mechanism with which applicant's device is operatively associated.

Figure 8:
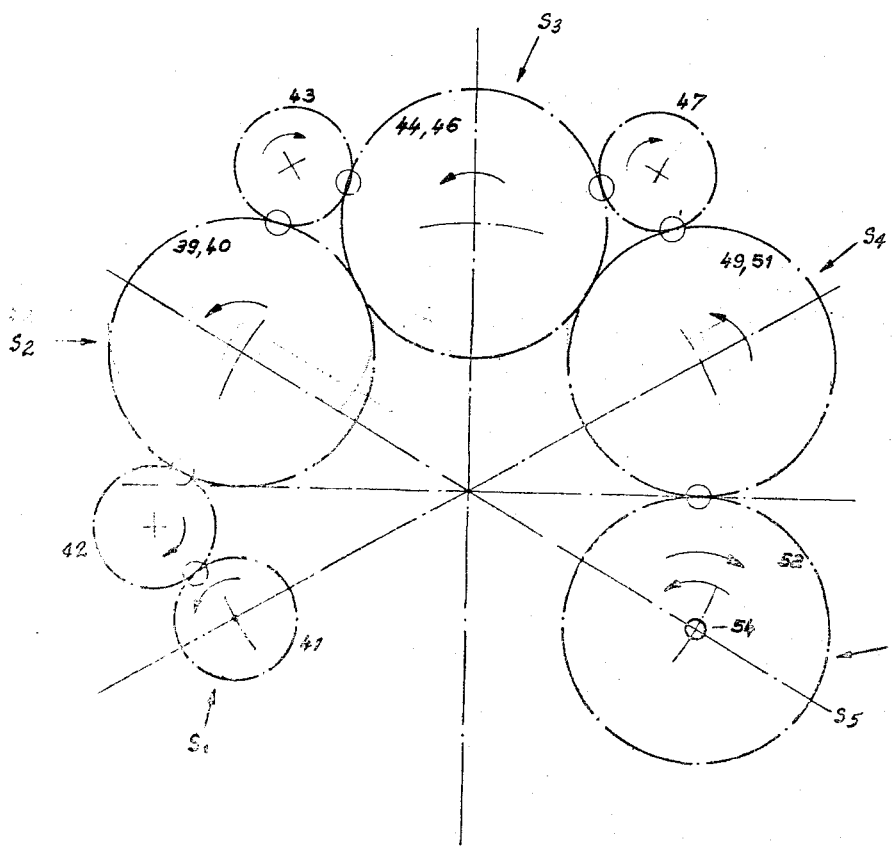
FIG. 8 is a vertical cross-sectional view of a power take-off gear train, this view being taken along line 8—8 in FIG. 1, and in the direction indicated.
Figure 9:
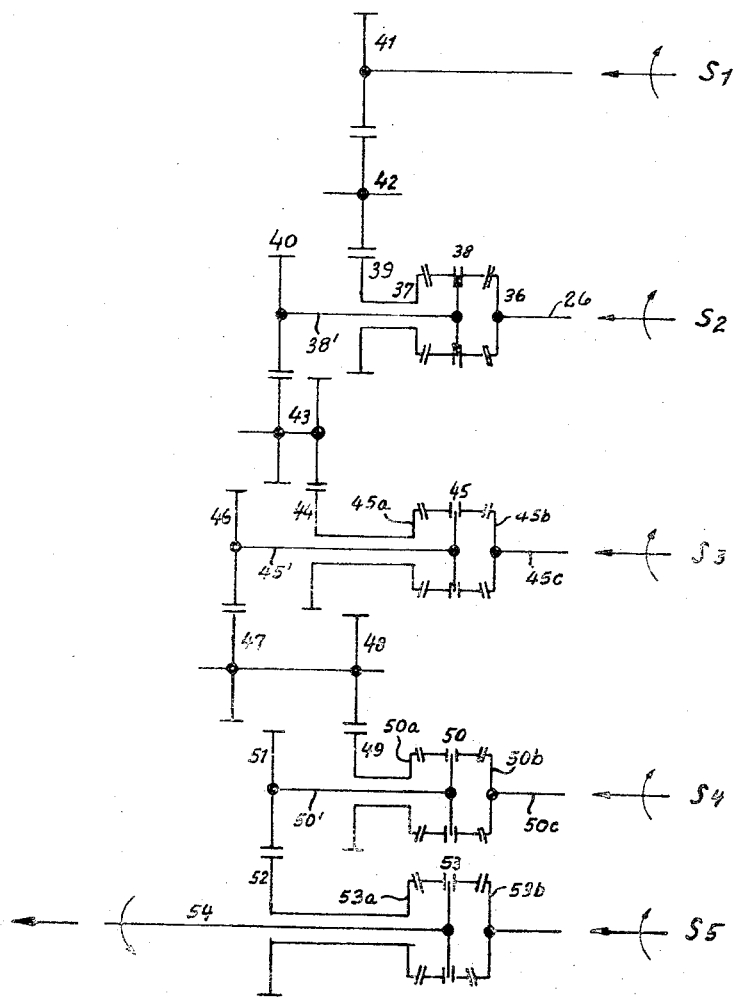
FIG. 9 is a schematic representation of FIG. 8.

FIGS. 8 and 9 show diagrammatically the general arrangement of an exemplary power take-off unit P to be engaged with the structural configuration of FIG. 1 at the left hand or output end, thereof. Such power take-off unit is constructed and arranged to operate as a velocity reducing mechanism based on powers of two.

Gear 41, the smallest gear in the set, and idler gear 42, are brought into engagement with the second integrator mechanism 38 in the manner indicated by the vertical arrow in FIG. 1 and by the schematic representation of FIG. 9. These two gears are the first reducing step, or $S_1$, in the set.

Rotation of idler gear 42 drives gear 37 and bevel gear 39, which are rigidly connected. The radius of gear 41 compared to gear 39 is selected to achieve a velocity reduction of one-half. Gear 39 drives central gear of integrator mechanism 38, which is permanently joined to one end of rigid shaft 38'. The other bevel gear 36 associated with integrator mechanism 38, is joined to output shaft 26 of unit K. By suitably phase-offsetting the rotative forces applied to bevel gears 36 and 37 as described in detail above, integrator mechanism 38 will produce a uniform output force at shaft 38' and gear 40, which gear is the second step, or $S_2$, of the power take-off unit P.

The output of gear 40, or $S_2$, forms one-half of the input for the third step of unit P, or $S_3$. Gear 40 drives idler gear 43, which in turn, drives gear 44 and bevel gear 45a of the succeeding integrator mechanism 45. Once again, there is a velocity reduction of one-half between gear 40 and 44, so that the initial rotational velocity of gear 41 has been reduced by one-fourth. The other bevel gear 45b is driven by input shaft 45c, and again, the motivating forces applied to integrator mechanism 45 are phase-offset so as to produce a uniform resultant movement of shaft 45' and output gear 46, which is secured to one end of shaft 45'.

Such arrangement for velocity reduction is repeated at the fourth step, or $S_4$. Again, gears 46 and 49 are so constructed and arranged to still further reduce the initial rotational velocity by a power or two, or phrased in another manner, by a factor of one-half. Integrator mechanism 50 is also driven by bevel gears 50a and 50b so as to produce a resultant uniform rotation of driven shaft 50' and output gear 51, which is permanently joined to one end of shaft 50'.

Output gear 51 drives gear 52 of the fifth step, $S_5$, which is connected to bevel gear 53a of integrator 53. Bevel gear 53b is driven over input shaft 53c, in phase-offset relationship so that a uniform, resultant force occurs at driven shaft 54. There is no further reduction of the input velocity when introduced into the fifth step of power take-off unit P so that the output rotational velocities of steps 4 and 5 are identical, although the direction of rotation between the steps is reversed.

The orientation of the plurality of steps in the power take-off unit P is seen in FIG. 8. Steps 1, 2, 3, 4 and 5 are spaced at 60° intervals around the central axis of unit A. Accordingly, in the exemplary embodiment illustrated, disc 9 must rotate an angular distance of 30° after bolts 72 and 73 have been lowered by solenoid 82 to enable camming surface 86 to shift both bolts 72 and 73 and thereby actuate both coupling rings 30 and 31. Bolts 72 and 73 must therefore be spaced behind one another at positions corresponding to an angular movement of 30° for disc 9. There are six evenly spaced camming surfaces 86 on the periphery of disc 9, and an equal number of evenly spaced return camming surfaces 85. Surfaces 85 and 86 are separated from each other by a small axial spacing.

Figure 10:
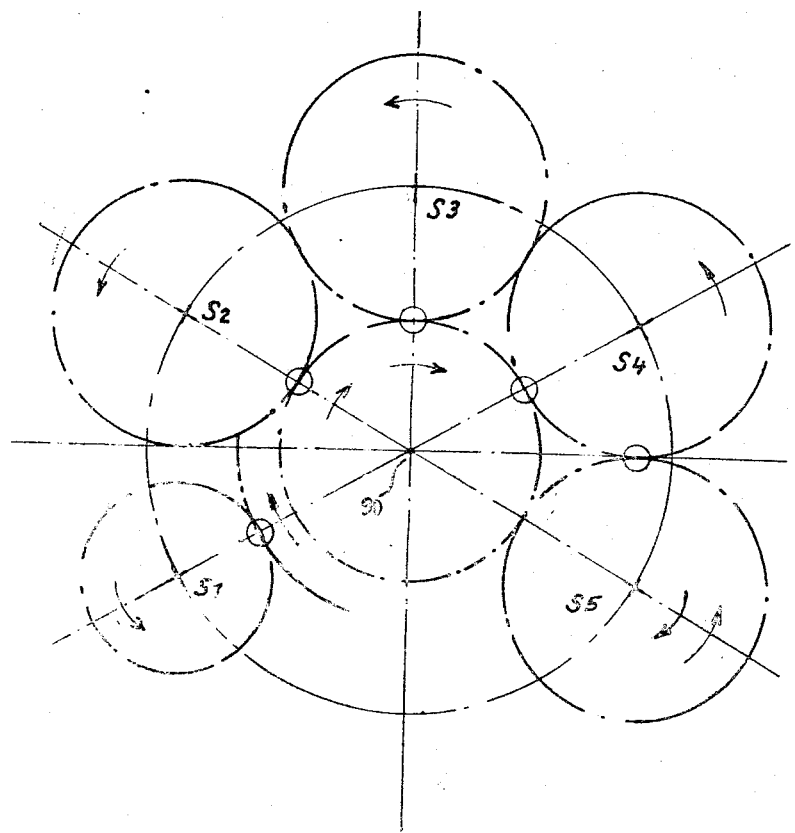
FIG. 10 is a vertical cross-sectional view of an alternative power take-off gear train.
Figure 11:
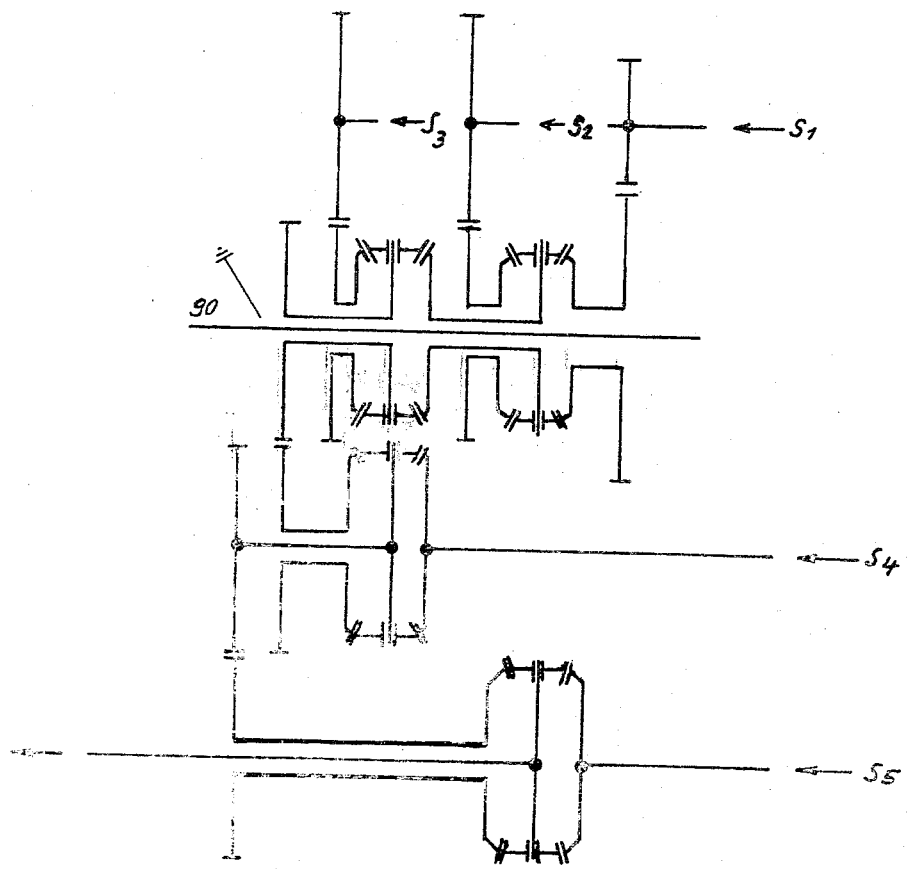
FIG. 11 is a schematic representation of FIG. 10.

FIGS. 10 and 11 show another embodiment of a power take-off unit P. This embodiment permits an even more compact arrangement, for steps 1 and 3 are arranged in series on one side of central axis 90 and steps 4 and 5 are disposed on the opposite side of such axis. The functioning of such take-off unit remains unchanged.

Figure 12:
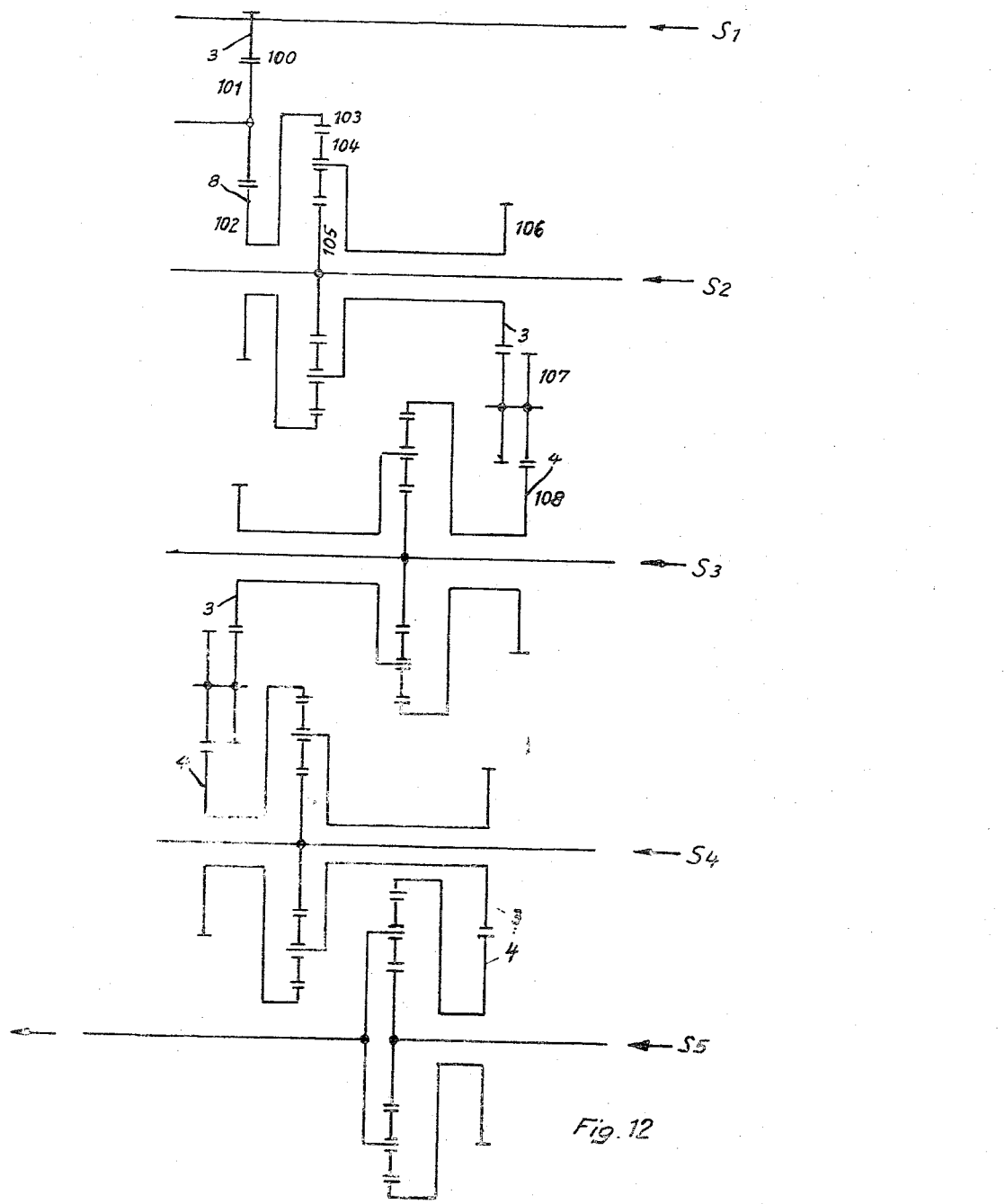
FIG. 12 is a schematic representation of yet another alternative power take-off gear train construction employing planetary drive mechanisms.

FIG. 12 diagrammatically shows another embodiment of a power take-off unit employing planetary gearing to reduce the input velocity in step-like fashion. Such an arrangement advantageously uses spur gears. However, the input and output velocity of each step within unit P act vary widely in relation to the output velocity of gear 40. This is due to the differences in diameters between inner, or sun gear 105, and outer, or planetary gear 103. In the modification of FIG. 12, the ratio of the diameters of gear 105 to 103 is 1:2. This difference must be compensated in the transfer between the successive steps in the train by selecting connecting wheels with the proper ratios. In order to conserve space, the successive steps of the train are offset from one another. The particular velocity ratios used in each step of unit P are indicated alongside the schematic representation of each step of FIG. 12. In the basic embodiment and modifications presented in FIGS. 1–12, the slip-free and thrust-free starting and stopping movements of driven shaft 26 was accomplished by the superposition or integration of two phase-shifted oscillating driving movements at gears 22 and 23 of unit A. In the absence of these movements, shaft 26 would be motionless.

FIGS. 13–20 illustrate a second basic embodiment wherein the driven shaft is constantly rotating. The phase-shifted oscillatory movements of the coupling unit either add to, or subtract from, the constant uniform angular velocity of such driven shaft, and thereby accomplish slip-free and thrust-free coupling and uncoupling operations.

Figure 14:
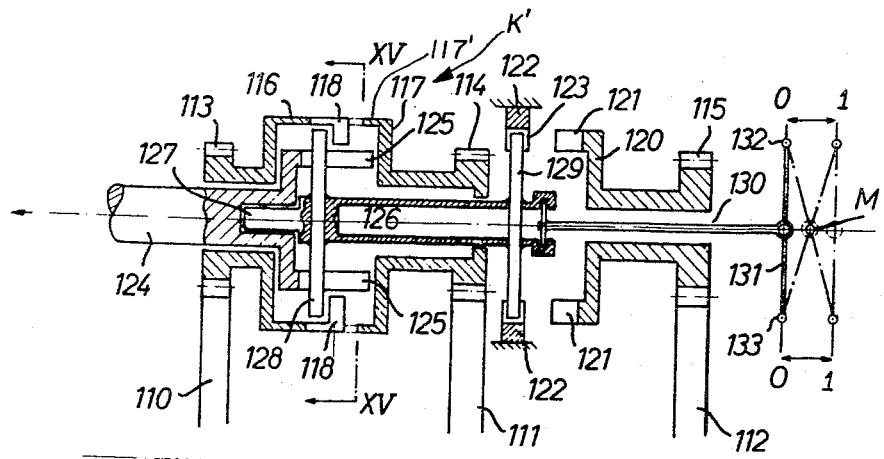
FIG. 14 is a cross-sectional view of the modified coupling unit and the control mechanism therefor.

FIG. 13 graphically shows the velocity relationship for applicant's second basic structural embodiment, in the same manner as FIG. 2 graphically illustrates the first basic embodiment. FIG. 14 shows the structural configuration that functions in accordance with the graph of FIG. 13, and for the sake of clarity, this structural configuration will be described first, so that the significance of the graph will be more fully understood when subsequently discussed.

Output gears 110 and 11 correspond to output gears 22 and 23 of input drive unit A in FIG. 1, and execute periodic phase-offset oscillating movements I and II. A third gear 121 rotates at a constant rate and adds the reference movement III seen in FIG. 13. An input drive unit, such as unit A of FIG. 1 is provided to drive gears 110 and 111. Gears 110, 111 and 112 are operatively gears 113, 114 and 115, respectively, of coupling unit K'. Gear 113 has laterally extending flange or collar portion 116 that rotates freely about shaft 124. Coupling jaw 118 is located at the end of the flange 116. Gear 114 has a laterally extending flange or collar portion 117 that rotates freely about driven shaft 124. Fingers 117' are located at the end of flange 117. Fingers 117' are complementary in shape to jaw 118, so that these members may be positively engaged under the conditions discussed subsequently.

Gear 115 has a collar or flange 120 that rotates freely about connecting rod 130. Coupling jaws 121 are formed at the end of collar 120. Jaw 121 cooperates with stationary locking ring 122, which ring has complementary jaws 123 which can be engaged with jaws 121. Jaw 118 is spaced twice the distance away from fingers 117', and jaw 121 is spaced twice that distance away from clutching member 129, so that when gear 110 is operatively associated with coupling unit K', gear 112 is not in operative association, and vice versa. Jaws 117' and 118 are radially offset.

The clutching mechanism for transmitting the phase-off-set rotative forces present at gears 110 and 111 and the uniform rotative force present at gear 112 in proper sequence to driven shaft 124 of coupling unit K' is seen in FIGS. 14 and 15. A pair of semi-circular coupling sleeves 125 are formed at one end of shaft 124. These sleeves are discontinuous in nature, and a recessed slot 125' is formed between the ends of sleeves 125.

Axially shiftable coupling shaft 126 controls the operation of driven output shaft 124 of unit K' as it is moved axially between its three control positions. Shaft 126 has an axially extending nose 127 which is journalled within a complementary recess in shaft 124. Coupling members 128 and 129 extend through shaft 126 at opposite ends thereof.

Coupling member 128, which can be a bar or link, performs a multiplicity of functions in accordance with its axial position within slots 125'. When member 128 is seated at the inner-most portion of slots 125', as seen in FIG. 14, member 128 is out of engagement with jaws 118 and 117', so that no rotative forces are transmitted to shaft 124. When member 128 is shifted axially to the right a short distance, member 128 is connected to jaws 118 of gear 113 to transmit motion from output gear 110 of unit A to shaft 124. This initial force gradually overcomes the inertial forces present at shaft 124. When member 128 is moved axially beyond jaws 118, member 128 is engaged with jaws 117' of gear 114 to transmit motion from gear 111. The engagement of member 128 with jaws 118 constitutes a first control position, and the engagement of member 128 with jaws 117' constitutes a third control position. The interval between engagement in a first and third control position constitutes a second or central control position, wherein gear 112 provides a uniform rotational force to be transmitted to shaft 124.

Member 129, which is identical in configuration with member 128, is also axially shiftable into three operative positions. In its left hand position or first control position, member 129 is engaged with stationary detenting disc 122, and in its central or second control position, member 129 is positioned in engagement with jaws 121 so that gear 112 provides uniform rotational forces for shaft 124. In its right hand or third control position member 129 is shifted further to the right within jaws 121 to thereby maintain the transmission of rotational forces from gear 112.

Coupling shaft 126 is axially shiftable to define the three control positions for members 128 and 129. In the left hand position, shaft 126 cannot transmit power to driven shaft 124 for member 129 is engaged with locking ring 122. In the right hand position, shaft 126 is alternatively coupled and uncoupled with rotating jaws 118 of gear 116 and coupling jaws 117' of gear 114. In the second or central control position, shaft 126 is coupled to constantly rotating gear 115 by the engagement of member 129 with jaws 121.

The control mechanism for shifting coupling shaft 126 is positioned at the right hand end of FIG. 14. Connecting rod 130 is joined by pin 130' to the left hand end of shaft 126. Lever 131 is joined to the rod 130. Lever 131 is operatively associated with a pair of solenoids (not shown) at its extremities 132 and 133 and is attracted toward these solenoids when activated. The movement of lever 131 occurs in the proper phase offset relationship, similar to the arrangement of FIGS. 4 and 5. During the course of axially shifting shaft 126 from left to right, first extremity 132 is moved from its "0" (zero) position to its "1" (one) position, and then extremity 133 is moved from its "0" (zero) position to its "1" (one) position. Accordingly, rod 130 moves from an unactuated position to a central position M, and then to a fully actuated position, as seen in the dotted lines in FIG. 14. During the course of such movement of rod 130, shaft 126 is shifted from its left hand position where it is driven by gear 110, to its central position (where it is driven by gear 112), and into its right hand position, where gear 111 provides a retarding movement. The return movement of rod 130 from its right hand position through its central position to its left hand position occurs in a reversed sequence when the solenoids associated with extremities 132 and 133 are de-energized.

Extremities 132 and 133 on lever 131 could be shifted with equal facility by a system similar to that employed in FIG. 4, wherein links 70 and 71 were controlled by solenoid 82 and camming surfaces 85 and 86 on coupling disc 9 which contacted shiftable bolts 72 and 73.

Referring back to FIG. 13, Roman numeral I and II represent the two phase offset motions fed into unit K' by gears 110 and 111 to gears 113 and 114, respectively. Roman numeral III represents the uniform speed of gear 115, which is driven by gear 112. Coupling mechanism K' is designed so that coupling and uncoupling of gears 113 and 114 can occur only at times in the operational cycle when gear 112 has reached its maximum angular velocity. This relationship is shown in solid lines in the velocity vs. time graph and represents the velocity of the driven shaft 124.

At time $T_1$, shaft 124 is motionless for member 129 is held stationary by locking ring 122. Then shaft 124 is coupled to a first driving gear 112 to receive the rotative force supplied by gear 110 of the input drive unit, and is gradually accelerated thereby as indicated by reference character I. At point $T_2$, shaft 124 has overcome its inertial resistance and attains the same speed as gear 112, which is then uncoupled. Simultaneously, driven shaft 124 is coupled to uniform rotating gear 115, which is driven by gear 112. Shaft 124 is driven by gear 112 for a desired time interval at a uniform speed represented by reference character III. At the desired time, $T_3$, shaft 124 is coupled to gear 113, represented by Roman numeral II, and the motion of gear 113 gradually retards the resultant motion of shaft 124, until point $T_4$ is reached. At this point, member 129 on shaft 126 is again connected to disc 122 and retained in its motionless position. Accordingly, it can be seen that the phase offset motions of gears 113 and 114, respectively, alternately smoothly accelerate and decelerate the resultant movement of shaft 124.

FIG. 16 shows a modification of the control mechanism for shifting rod 130, utilizing a pneumatic circuit including cylinder 135 and piston 136. Control pistons 139 and 138 selectively connect either the front end or the rear end of cylinder 135 with the source of compressed air 139. Pistons 137 and 138 are shifted between their two control positions by solenoid 140.

When solenoid 140 is energized, armature 140a is attracted toward the solenoid overcoming the biasing force of spring 140' and shifts piston 137 in front of port 137a and piston 138 atop port 137b. Source 139 thereby communicates with the cavity in cylinder 135 to the left of piston 136, and shifts same and rod 130 to the right. When solenoid 140 is deenergized, pistons 137 and 138 are shifted leftward to their other control position under the urging of spring 140b.

Figure 18:
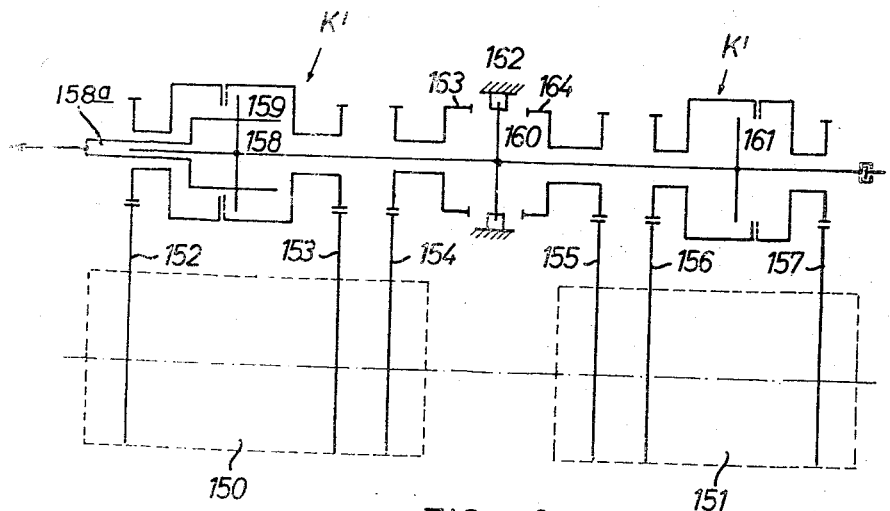
FIG. 18 shows a schematic representation of a modified coupling unit similar to that shown in FIG. 14.
Figure 17:
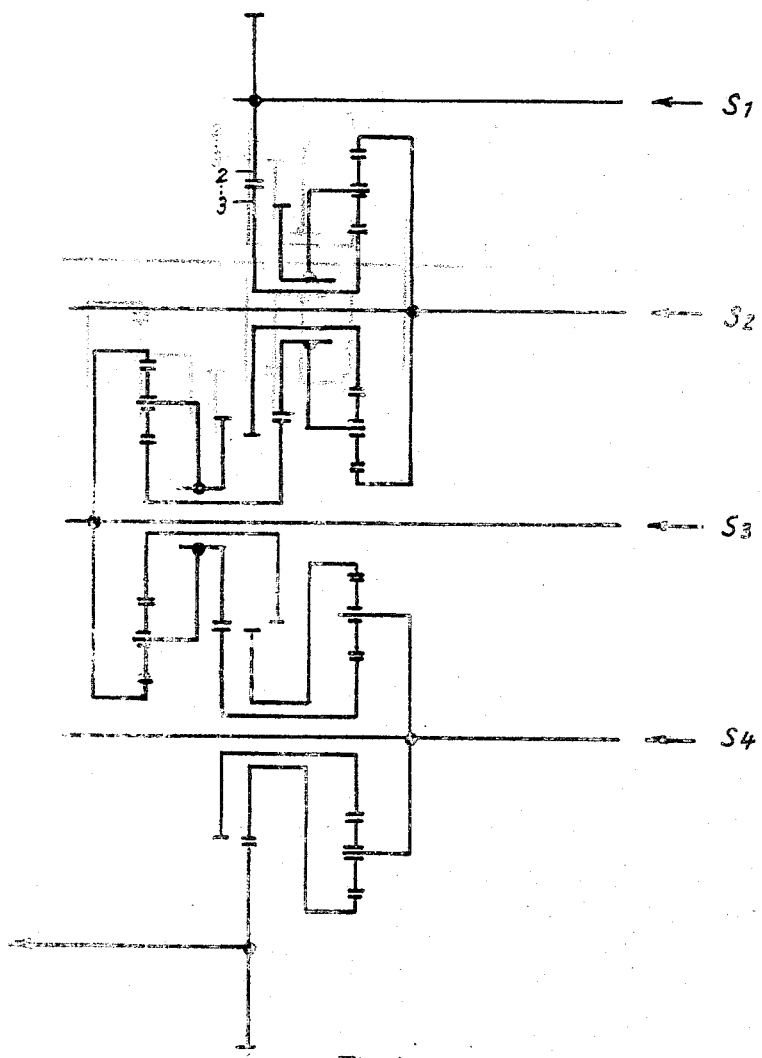
FIG. 17 shows a power take-off gear train for use in conjunction with the output shaft of FIG. 14.
Figure 19:
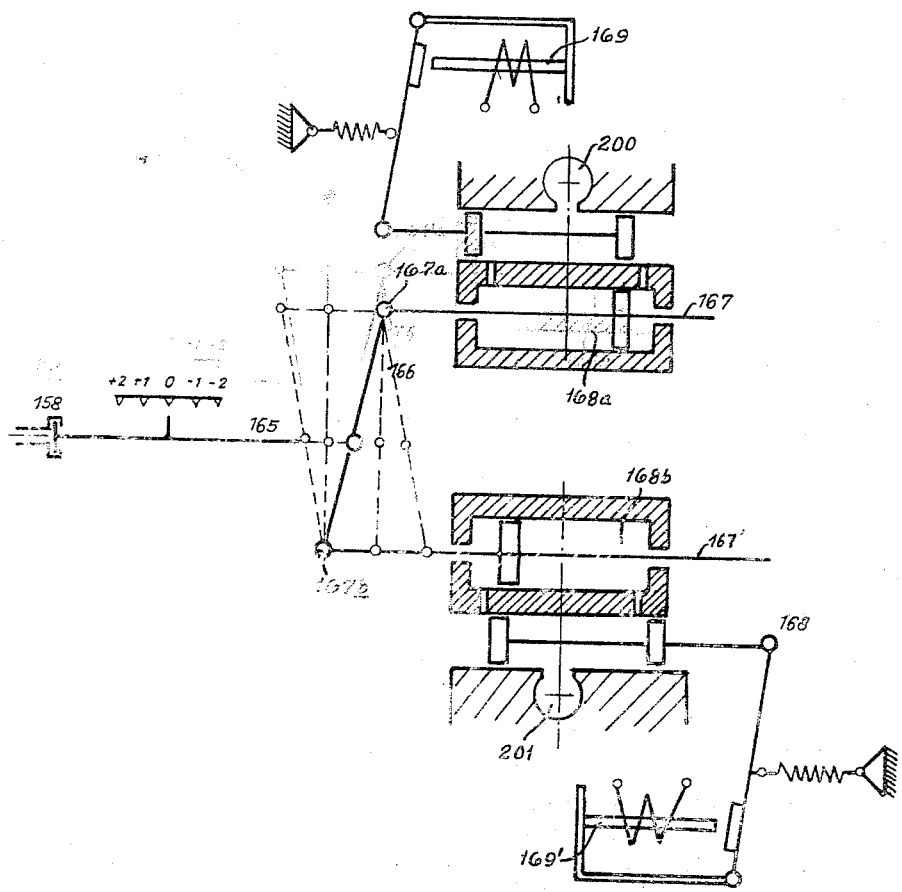
FIG. 19 is a schematic representation of a pneumatic control mechanism.

FIGS. 17–19 represent schematically the use of a radially spaced power take-off gear train employing planetary gears. FIG. 17 shows the arrangement and cooperation between steps 1–5 of the power take-off train. Each individual step can be driven either clockwise or counterclockwise, depending upon the presence or absence of idler gears. The overall system is similar to FIG. 12.

FIG. 18 shows the construction of a single step within the power take-off train. Two central drive units 150 and 151 are present, one unit for supplying clockwise motion and the other unit for supplying counterclockwise motion. Drive unit 150 has uniformly running wheel 154 and phase offset driving gears 152 and 153. Drive unit 151 has a uniformly running gear 155 rotating at the same speed and in the opposite direction to gear 154, and a pair of phase offset gears 156 and 157.

The two drive units are selectively engaged under the control of axially shiftable coupling rod 158, as seen in FIGS. 18 and 19. Rod 158 has coupling members 159, 160 and 161 disposed thereon. When rod 158 is shifted axially in one direction, then member 159 determines the nature of the rotational force supplied to driven shaft 158a by drive unit 150. When rod 158 is shifted axially to the right into its other extreme position, then member 161 controls the movement supplied to shaft 158a by drive unit 151. The central coupling member 160 is selectively engaged with disc 162 or with uniformly rotating gears 163 and 164 of drive units 150 and 151, respectively.

Whereas, rod 130 in FIG. 14 can assume three control positions, represented by velocity ratio of +1,−1, coupling rod 158 can assume five control positions, represented by velocity ratios of +2,+1,0−1−2. The central position corresponds to the zero or stop position, while one end position corresponds to a plus two position (clockwise rotation) and the other end position corresponds to a minus two position (counterclockwise rotation). Between the midpoint and the two extreme positions, there is a minus one and a plus one position, which represents the acceleration or deceleration phase that occurs before and after the velocity at driven shaft 158a reaches its maximum level.

FIG. 19 shows the control mechanism for shifting rod 158 into its five positions. Link 165 extends from the end of rod 158 and joins the rod to pivotable lever 166 at the midpoint of this lever. Extremity 167a is secured to piston assembly 167, and extremity 167b is secured to assembly 167'. Piston assembly 167 is reciprocated within cylinder 168a in accordance with the manner in which the pressurized fluid from source 200 enters the cylinder. This flow path, in turn, is determined by the selective energization of solenoid 169 which shifts piston assembly 167 between its control positions.

Piston 167' is reciprocated within cylinder 168b in accordance with the manner in which the pressurized fluid from source 201 enters this cylinder. Solenoid 169' controls piston assembly 167' in the same manner as described above.

FIG. 20 shows a single step of a modified power take-off train using a velocity step ratio of three between each step of the train. The design of the overall train is shown in FIG. 17, and the principle of superimposing two phase offset motions upon a uniform motion is utilized to produce a slip-free and thrust-free coupling and uncoupling cycle of operation.

The input gears of FIG. 20 which provide phase offset motion to integrator 170 are rotatable in both directions. Gears 172 and 173 are driven by output gear 23 of an input drive unit such as unit A, and gears 174, 175 are driven by output gear 22 of the input drive unit to produce a resultant movement on shaft 170'. Coupling units 176 and 178 control the rotation in one direction and units 177 and 179, which are mounted on a second shaft 171, control the rotation in the opposite direction. The reversal of the direction of rotation is accomplished by the engagement of idler gears 181 and 183 with the drive train. Coupling units 176–179, respectively, are constructed in the manner described in conjunction with FIGS. 1–6. Obviously, the single input drive unit can control a plurality of radially spaced clutches.

Although certain specific embodiments of the invention have been illustrated and described, it is understood that the invention is capable of many modifications in the construction of the various components of the system without departing from the spirit or scope of the invention, as set forth in the appended claims. Accordingly, such claims should be broadly construed commensurate with the advance in the arts and sciences realized by this invention.

I claim:

1. Slip-free and thrust-free coupling mechanism for a compound gear train comprising:
   an input drive unit including:
   input drive means (1, 2) adapted to be rotated at a constant angular velocity,
   crank shaft means (6, 7, 11, 11a) connected to said input drive means for receiving rotational forces therefrom,
   coupling disc (3, 4, 5, 8, 9) means also being connected to said input drive means for receiving rotational forces therefrom,
   lever means (10, 12, 15, 17, 19, 20'; 10', 13, 14, 16, 18, 20) pivotably mounted upon said coupling disc means at predetermined angular intervals,
   said crank shaft means connected to said lever means to impart rotational movement to said lever means,
   output drive means including output gears (22, 23) connected to said lever means to receive rotational movements therefrom in phase offset relationship related to said predetermined angular intervals,
   coupling units (K) for translating the phase offset movement of the output gears of the drive input unit into a uniform resultant movement, each coupling unit including:
   a driven output shaft (26),
   input gear means (24, 24'; 25, 25') freely mounted upon said driven shaft and connected to said output gears,
   integrator means drivingly connected to said output shaft to actuate the same, said integrator means superimposing the phase offset movements of said input gear means into a uniform movement of said output shaft,
   clutching means (30, 60, 62, 64; 31, 61, 63, 65) on said driven shaft movable to an operative position for connecting said input gear means to said integrator means,
   detenting means (32, 33) on said driven shaft for normally disabling said clutching means, and
   shifting means (60, 66, 68, 70, 79, 80, 82, 85, 86; 61, 69, 71, 73 78, 81, 85, 86) controlled by said coupling disc means for shifting said clutching means between its disabled position and its operative position.

2. A coupling mechanism as defined in claim 1 wherein said clutching means comprises a coupling ring (30, 31) with a pair of axially extending jaws (62, 64; 63, 65), each of said pair of jaws being disposed on opposite sides of said coupling ring.

3. A coupling mechanism as defined in claim 1 wherein said shifting means comprises a pivotable linkage (68, 70, 79; 69, 71, 78) joined at one end to said clutching means, the opposite end of said linkage having coupling bolts (72, 73) thereon.

4. A coupling mechanism as defined in claim 3 wherein said shifting means further includes solenoids (82) with armatures (80, 81), said coupling bolts being vertically shiftable within guide sleeves (74, 75), from an inoperative position to an operative position in response to the energization of said solenoids.

5. A coupling mechanism as defined in claim 1 wherein said coupling disc means has camming surfaces (85, 86) formed as a continuous band around its periphery.

6. A coupling mechanism as defined in claim 1 wherein a lever means comprises an axially extending post (10, 10') joined to said coupling disc means (9), a first lever (14, 15) mounted at its midpoint, said first lever being connected to said crank shaft means at one end thereof, a link (16, 17) connected to said first lever at the opposite end thereof, said link being connected by a pin (18, 19) to a second lever (20, 20'), said second lever being secured to an intermediate driven shaft (21, 21') to rotate the same.

7. A coupling mechanism as defined in claim 1 wherein a plurality of coupling units (K) are mounted in a radial array around said input drive unit and drivingly connected to said output gears (FIG. 7), and a power take-off unit (P) is operatively connected to each of said coupling units.

References Cited by the Examiner
UNITED STATES PATENTS

| | | | |
|---|---|---|---|
| 1,791,698 | 2/1931 | Armitage et al. | 74—679 |
| 1,979,723 | 11/1934 | Armitage et al. | 74—679 |
| 2,521,771 | 9/1950 | Bechle | 74—681 |
| 2,771,793 | 11/1956 | Robbins | 74—681 X |
| 2,804,784 | 9/1957 | Blumenttritt | 74—681 |
| 2,878,688 | 3/1959 | Palmer | 74—679 X |
| 3,027,779 | 4/1962 | McNaney | 74—679 |
| 3,060,766 | 10/1962 | Heinrich | 74—681 X |
| 3,114,273 | 12/1963 | Boggs | 74—679 |

FOREIGN PATENTS

| | | |
|---|---|---|
| 833,533 | 7/1938 | France. |
| 916,900 | 8/1946 | France. |

DAVID J. WILLIAMOWSKY, *Primary Examiner.*

DON A WAITE, *Examiner.*

T. C. PERRY, *Assistant Examiner.*